United States Patent
Söchtig et al.

[11] Patent Number: 5,858,416
[45] Date of Patent: Jan. 12, 1999

[54] PROCESS AND DEVICE FOR MANUFACTURING PLASTIC PARTS WITH REINFORCEMENT FIBERS

[75] Inventors: Wolfgang Söchtig, Germering; Josef Renkl, Markt Indersdorf; Adolf Bauer, Olching, all of Germany

[73] Assignee: Krauss-Mafei AG, Munich, Germany

[21] Appl. No.: 776,079

[22] PCT Filed: May 8, 1996

[86] PCT No.: PCT/EP96/01925

§ 371 Date: Feb. 3, 1997

§ 102(e) Date: Feb. 3, 1997

[87] PCT Pub. No.: WO96/35562

PCT Pub. Date: Nov. 14, 1996

[30] Foreign Application Priority Data

| May 8, 1995 | [DE] | Germany | 195 16 806.2 |
| Oct. 12, 1995 | [DE] | Germany | 195 38 021.5 |

[51] Int. Cl.⁶ .............................. B29B 7/76; B29C 70/30
[52] U.S. Cl. ......................... 425/117; 425/543; 425/226
[58] Field of Search .................. 264/108, 240, 264/349, 328.6, 328.8, 32.19; 425/117, 543, 225, 226

[56] References Cited

U.S. PATENT DOCUMENTS

| 4,309,373 | 1/1982 | Althausen et al. .............. 264/240 |
| 4,721,391 | 1/1988 | Bauer ............................. 264/328.6 |
| 4,809,909 | 3/1989 | Kukesh . |
| 5,277,567 | 1/1994 | Bauer et al. ................... 264/328.19 |
| 5,382,394 | 1/1995 | Terhardt ......................... 264/240 |
| 5,435,710 | 7/1995 | Gumery et al. ................ 264/328.19 |

FOREIGN PATENT DOCUMENTS

| 0 037 523 A1 | 10/1981 | European Pat. Off. . |
| 0 594 981 A1 | 5/1994 | European Pat. Off. . |
| 2 017 548 | 10/1971 | Germany . |
| 2 242 251 | 3/1972 | Germany . |
| 26 28 854 | 1/1978 | Germany . |
| 63170020 | 7/1988 | Japan . |
| 1 360 803 | 7/1974 | United Kingdom . |
| 1 418 091 | 12/1975 | United Kingdom . |
| 1 579 546 | 11/1980 | United Kingdom . |
| WO 93/01444 | 1/1993 | WIPO . |

OTHER PUBLICATIONS

"Time For A Change" by V. Wigotsky published in Plastics Engineering/ Aug. 1996.

*Primary Examiner*—Mathieu D. Vargot
*Attorney, Agent, or Firm*—Herbert Dubno

[57] ABSTRACT

An apparatus for producing a fiber reinforced synthetic resin provides a fiber feed passage through an outer chamber to which the synthetic resin for feed. A feed passage for the fiber extends concentrically in this chamber and has a tubular formation of a diameter less than that of a cleaning piston which is displaceable in the annular space between this tubular formation and the inner wall of the chamber.

18 Claims, 4 Drawing Sheets

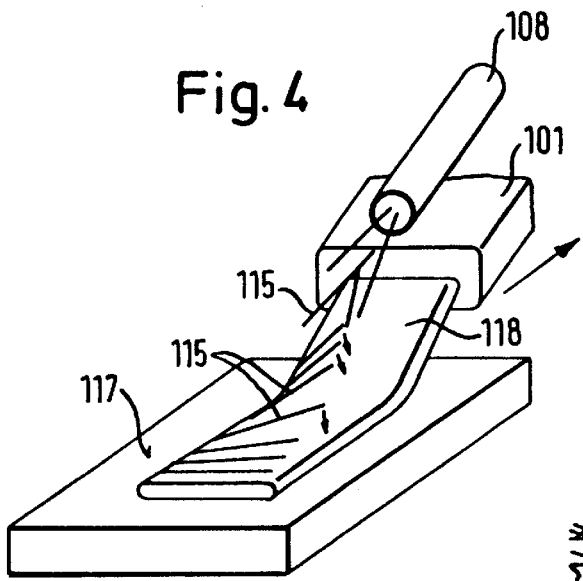
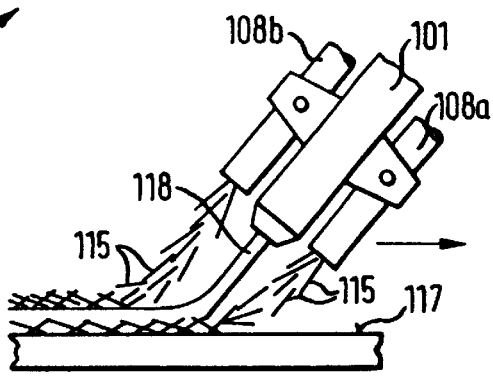
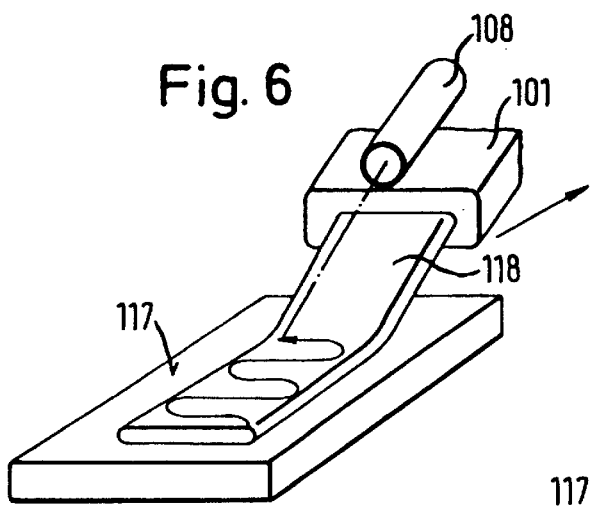
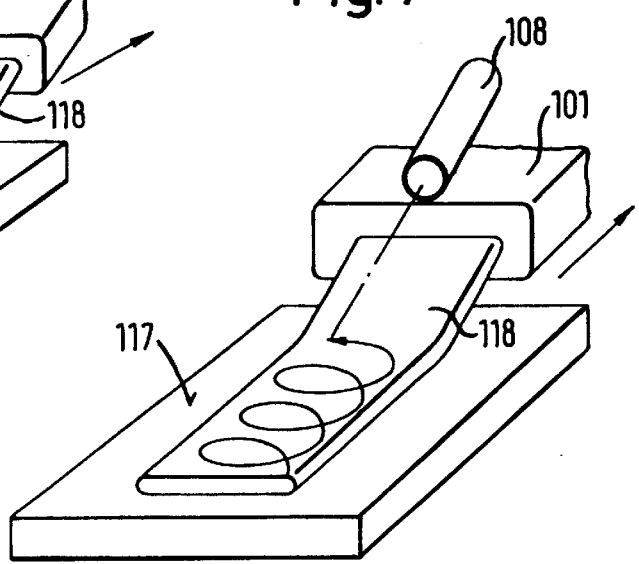

PROCESS AND DEVICE FOR MANUFACTURING PLASTIC PARTS WITH REINFORCEMENT FIBERS

CROSS REFERENCE TO RELATED APPLICATIONS

This is a national stage of PCT/EP96/01925, filed May 8, 1996, which is based, in turn, upon German national application 19516806.2 of 8 May 1995 and German national application 19538021.5 filed 12 Oct. 1995.

FIELD OF THE INVENTION

The invention relates to a process and a device for producing plastic articles containing reinforcement fibers.

BACKGROUND OF THE INVENTION

In the production of plastic parts by the reaction casting process, the reaction mixture is combined with fillers like, for example, glass fibers or carbon fibers to improve the mechanical properties of the finished parts. For this purpose, one or both of the chemically reactive components of the plastic have fibers mixed therewith. However, only very short fibers (about 0.2 mm in length) can thus be incorporated since otherwise the viscosity of the reactive plastic component will be increased to the point that, with high pressure injection, there is not sufficient admixing of the components. Furthermore, when long fibers are used in a high pressure injection of the plastic components into the mixing chamber, fiber breakage occurs.

From DE-OS 28 23 189 it is already known to feed glass fiber into the mixing chamber of a polyurethane apparatus via a supply passage, together with a portion of one of the components of the chemically reactive plastic. Since this component of the material charged with glass fibers can only be fed to the mixing chamber in a pumping process with the pressure prevailing in the mixing chamber, only short fibers can be used if breakage of the fibers during the pumping process and upon injection into the mixing chamber is to be avoided. The material stream fed additionally into the mixing chamber via the feed passage also creates problems with the maintenance of precise stoichiometric proportions which must be insured in the mixture of the chemically reactive plastic components so that there is no guarantee of a constant quality of the end products.

From German Patent Document 44 17 596 it is known, further, to introduce via a device of the aforedescribed type, the filler via a separate passage into the calming chamber by means of a fluidizing gas. The introduction of the filler is thus effected, however, only at one location along the edge region of the flow of the reaction mixture which can result in a nonuniform distribution of the filler in the finished part.

It is also known from DE 33 13 042 A1 to introduce fillers, e.g. pigments, by means of a bore provided with a throttle device into the reaction mixture. The introduction of the filler is here at the throttle location can give rise to strong pressure fluctuations resulting in damage to pressure-sensitive fillers. Since the introduction is also effected counter to the flow direction of the reaction mixture, this device is also not suitable for the introduction of long fiber fillers.

Further from DE-OS 29 24 554, it is known to mix the filler substances with the reaction mixture in the mixing chamber via an axial bore in which a piston is arranged. The piston is reversibly displaced in a cylindrical chamber from which the reaction mixture is ejected at intervals into the interior of a mold. The displacement of the filler, e.g. of glass fibers, through the axial bore and a lateral supply duct is not simple to accomplish. It can be effected only via a pressurization of the filler in which case it is advantageous to provide the filler in a liquid or doughy state so that it can be forced into the chamber by pumping. With this feed device, however, only short fiber fillers can be fed. Since the glass fibers and possibly the flowable medium transporting the glass fibers are introduced directly into the mixing chamber, there is also the danger that the mixing of the chemically-reactive components will be disturbed and that the required precise stoichiometric mixing ratio for generating a uniform quality of the end products cannot be established.

In the same way there is according to GB 1 245 216 the drawback that a direct introduction of the additive substances into the mixing chamber will interfere with the mixing and give rise to quality defects in the end products.

Furthermore, it is known in the production of plastic parts composed of thermoplastic synthetic resins to feed a melt of a thermoplastic synthetic resin generated in a plastifying unit by means of a movable injection unit via an open mold to thereby obtain a strand of a flowable melt, whereby in the mold ahead or following strand formation, a plaited mat of long reinforcing fibers is laid into the open mold. The mat is then pressed together with a strand-shaped melt to a plastic part reinforced with the elongated reinforcing fibers. This fabrication process is relatively expensive since the plaited mat must be trimmed to the contour of the mold before it is fed into the mold.

It can be necessary, further, to preform the plaited mat in a previous molding process in which case the plaited mat may have to be supplied with a finely divided particulate thermoplastic so that the preformed plaited mat can retain its shape for the next working step.

OBJECT OF THE INVENTION

It is the object of the invention to so improve a process and a device for the production of plastic parts reinforced with long reinforcing fibers that pressure-sensitive and long fiber fillers can be used completely without damage and in a single operating step without prepressing, utilizing incorporation of the fibers in a plastic mold supplied with flowable plastic while ensuring a homogeneous distribution.

SUMMARY OF THE INVENTION

The invention utilizes the fact that an especially high quality combination of the two components can be achieved by combining a laminar and pressureless flow of the flowable plastic and a stream of the filler substance.

It is especially advantageous with this method that long reinforcing fibers can be incorporated in flowable synthetic resin in a single working step and by a single apparatus and then introduced into a plastic mold, whereby per operating step the lengths of the fibers and the density with which the fibers are incorporated can be varied in an optional manner. Through the use of flowable plastic which arises from a mixture of chemically-reactive plastic components up to now, it has been possible to use reinforcing fibers only of very reduced length (about 0.2 mm) or to use reinforcing fibers previously formed into fiber mats and introduced into the mold after preparation in special processing steps.

In a preferred embodiment of the invention the mixture of chemically reactive plastic components as a flowable synthetic resin is fed into a cylindrical discharge chamber in which a cleaning piston is reversibly displaced and through whose central region a patent feed passage runs. As a consequence of a tubular extension at the end of the cleaning piston, within the discharge chamber an annular flow passage is provided through which a hose-like mixture stream is formed into whose central region the fiber feed passage opens, providing the possibility of incorporating long reinforcing fibers in the flowable synthetic resin. The reinforcing fibers are thus completely ensheathed by flowable plastic. Basically, however, flow configurations are also suitable with which the simultaneously generated flow of long reinforcing fibers is only partly ensheathed or is displaced in substantially parallel flows with the stream joining it of flowable plastic. According to the invention it is important that both components, the flowable plastic on the one hand and the long reinforcing fibers on the other, be brought together continuously in codirectional and streams.

Instead of a tubular formation rigidly connected with the cleaning piston to form the tubular passage, the annular flow can also be generated with the aid of an immersion tube which traverses the cleaning piston centrally and forms the fiber flow passage. The cleaning piston can thus be moved independently of the immersion tube. The immersion tube can traverse not only the cleaning piston but also its hydraulic actuating elements and can be affixed to the housing of the device. This affords the advantage that the units for producing long reinforcing fibers and for transporting these reinforcing fibers through the fiber feed passage in the immersion tube can be arranged to be fixed on the housing.

Instead of the aforedescribed device for generating a hose-like stream of flowable plastic, an annular nozzle can also be used in whose central region the fiber feed passage or a passage for feeding another filler can open.

The devices for generating a flow of long reinforcing fibers can also comprise, for example, respective pairs of feed rollers arranged at the inlet opening for the fiber feed passage and which shoot an endless fiber strand drawn from a spool and with high velocity through the fiber feed passage.

Advantageously, the feed rollers are provided with cutting devices which subdivide the reinforcing fibers into pieces of given length. When a plurality of feed roller pairs with different diameters for generating fiber sections of different length are arranged adjacent one another and these feed rollers are positionable in optional sequence with respect to the inlet opening of the fiber feed passage, the stream of flowable plastic can be supplied with different lengths of reinforcing fibers in time sequence. It is especially advantageous when the device for generating the two streams of flowable plastic and of long reinforcing fibers is fed over the surface of a plastic mold to generate a flat plastic part permeated with long reinforcing fibers. By varying the lengths of the fiber sections by positioning the corresponding feed rollers in place at the inlet opening of the fiber feed passage, a plastic part can be obtained which contains fibers of different lengths depending upon the strength requirements and shape characteristics. Thus it can be advantageous to cover sharply inclined surface regions of the workpiece with flowable plastic which contains especially long reinforcing fibers. To the same effect, with different speeds of the supply rollers, the plastic part can be provided in certain regions with the fibers in higher or lesser density.

If the flowable plastic is shaped to a band-like flat stream by means of a wide slit nozzle, it is possible to coat one or both of the broad surfaces with a flow of long reinforcing fibers. A finishing process can thus be so configured that the device for generating the streams of flowable plastic and of long reinforcing fibers can be guided by a robot arm for surface coverage over the surfaces of an open mold. If first the flow of long reinforcing fibers is laid down on the surface of the mold and directly thereafter is covered with a flat stream of flowable plastic, after the closure and opening of the mold, a plastic part can result in which the long reinforcing fibers predominantly are embedded in the layer of the plastic part proximal to its surface.

The flat stream of flowable plastic can also be covered on both sides with a flow of long reinforcing fibers so that subsequent to the above described steps a plastic part is produced in which predominantly both surface regions are incorporated with long reinforcing fibers.

If the flow of long reinforcing fibers is directed on one or both edge regions of the flat flow and the angle which the long reinforcing fibers include with the surface of the flat flow is an acute angle (less than 90°) and further the lengths of the reinforcement fibers is not greater than the width of the flat stream, it can be ensured that the long reinforcing fibers which are stuck into the edge regions of the flat flow predominantly sunk into the surface of the flat flow or upon subsequent closure of the mold are pressed into the surfaces of the flat flow. Thus when long reinforcing fibers are incorporated in the surface regions of the open mold into the flat flow, no reinforcing fibers project beyond the edges of the mold surfaces which might otherwise interfere with a precise closure of the mold. Burr formation as a result of reinforcement fibers which lie between the mold halves can thus be excluded.

BRIEF DESCRIPTION OF THE DRAWING

The above and other objects, features, and advantages will become more readily apparent from the following description, reference being made to the accompanying drawing in which:

FIG. 4 is a diagrammatic perspective view of a wide slit nozzle guided over the surface of an open mold with a fiber feed passage trained on the edge regions of the deposited flat strand of flowable plastic;

FIG. 5 is a schematic side elevational view of the coating of a flat strand of flowable plastic from two fiber feed passages;

FIG. 6 is a schematic perspective view of the covering of a deposited flat strand of flowable plastic by means of a swinging fiber feed passage; and FIG. 7 is a view similar to FIG. 6 but with a circular motion of the fiber feed passage.

SPECIFIC DESCRIPTION

Figure 1:
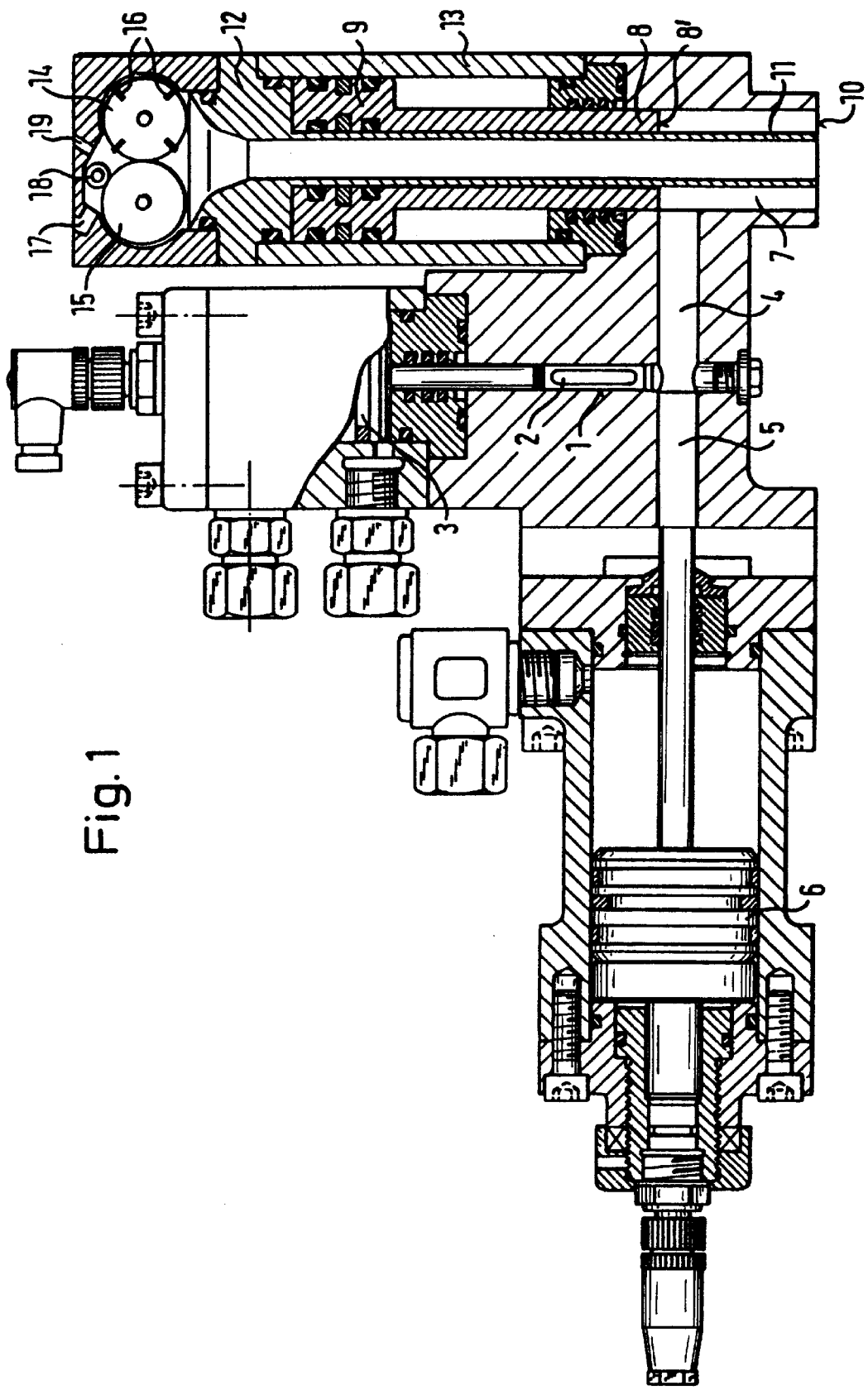
FIG. 1 is a side elevational view in a section through a mixing head for producing a mixed stream of chemically reactive plastic components with a device for feeding together with the mixed stream a stream of long reinforcing fibers.

FIG. 1 shows the mixing head of a polyurethane apparatus in which chemically reactive plastic components, like a polyol and an isocyanate are combined to a mixture of flowable synthetic resin. According to FIG. 1, a control piston 2 is arranged in a mixing chamber 1 and is reversibly displaced in the mixing chamber 1 by means of a hydraulic piston 3. Injection openings which are perpendicular to the drawing plane and are not shown open into the mixing chamber 1 for the chemically reactive synthetic resin components. The injection openings are controlled for simultaneous opening and closing by the control piston 2 which also fulfills the function of driving out of the mixing chamber 1 the reaction mixture formed in the mixing chamber 1 of the reactive synthetic resin components and of cleaning the walls of the mixing chamber 1 from the reaction mixture.

At a right angle to the mixing chamber 1 a calming chamber 4 communicates. A first cleaning piston 5 is reversibly displaceable in the calming chamber 4. The first cleaning piston 5 is actuatable by a second hydraulic piston 6.

Connected to the calming chamber 4 at a right angle thereto is an outlet tube 7 in which a second cleaning piston 8 is displaceable by means of a third hydraulic piston 9. The outlet tube 7 communicates via its discharge opening 10 into a mold cavity of an injection mold (not shown).

The second cleaning piston 8 and the third hydraulic piston 9 are centrally traversed by an immersion tube 11 which is fastened in the cylinder cover 12 of the hydraulic cylinder 13.

Via the immersion tube 11, a filler is fed from the exterior directly to the discharge opening 10 into the reaction mixture flowing from the discharge tube 7.

The immersion tube 11 is especially suitable for introducing long fibers, especially for the introduction of strands of glass fibers or carbon fibers.

The fiber strands are engaged by feed rollers 10 and 15 and shot through the immersion tube 11 into the reaction mixture.

One of the feed rollers 14 can be provided with cutting devices in the form of four blades 16 distributed about the roller periphery and with which the fiber strand is subdivided into predetermined length sections. Basically, via the feed rollers 14 and 15 a fiber strand which has previously been subdivided into length sections can also be shot into the reaction mixture through the immersion tube 11.

The fiber strand, following introduction through the inlet opening 17, is initially engaged by the feed roller 15 and the pressure roller 18, whereupon the fiber strand passes between the two feed rollers 14 and 15 and from the latter is centrally shot through the immersion tube 11.

Depending upon the length of the immersion tube 11, the long fiber strands or other fillers can be shot into optional regions of the discharge tube 7 into the reaction mixture. The fibers or the other fillers pass centrally through the reaction mixture flowing through the discharge tube 7 and is thus distributed uniformly in the cast body in the mold cavity, upon passage into the mold cavity.

The displacement of the fiber strand or the other filler through the immersion tube 11 can be supported by a fluidizing agent, like, for example, a pressurized gas which is fed through the opening 19. Instead of or in addition to the fluidizing agent, other fluid media can be introduced into the reaction mixture. For example, apart from fiber strands additional fillers can be fed with a fluidizing gas into the reaction mixture.

The invention has previously been explained in connection with an immersion tube 11 which traverses the cleaning piston 8 which is reversibly displaced in the discharge tube 7. An immersion tube of the described type can however also be arranged in the control piston 2 and in the mixing chamber 1 of a simple direct mixing head whose mixing chamber 1 has no calming chamber 4 downstream thereof. The immersion tube 11 can also be provided for a mixing head which is only comprised of a mixing chamber 1 and a calming chamber 4 in the cleaning piston and the calming chamber.

Figure 2:
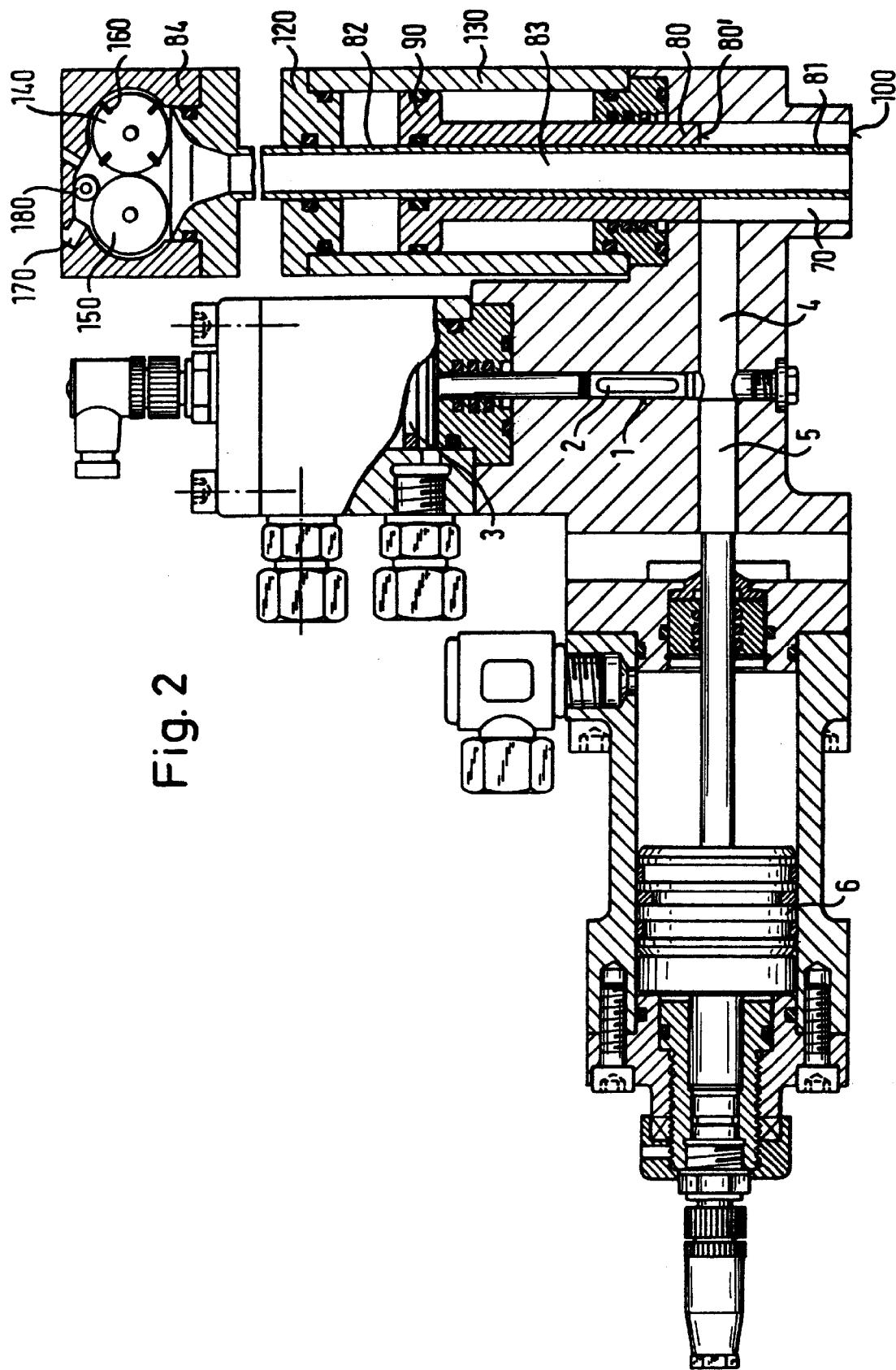
FIG. 2 is a similar view of a mixing head according to FIG. 1 with a modified device for feeding the mixed stream together with stream of long reinforcing fibers.

FIG. 2 shows a mixing head corresponding to that of FIG. 1 whereby for the correspondingly functioning elements the same reference characters 1–6 are used.

To the calming chamber 4 is connected at a right angle a discharge tube 70 in which a cleaning piston 80 is reversibly displaced. The cleaning piston 80 is actuatable by means of a third hydraulic piston 90. The discharge tube 70 opening with its outlet opening 100 into the mold cavity of an injection mold (not shown). The second cleaning piston 80 has a tubular formation 81 and the third hydraulic piston 90 has a tubular formation piece 82. Both the tubular formation 81 and also the tubular formation piece 82 are formed by a tube pressed rigidly into the cleaning piston 80 so that the cleaning piston 80, the tubular formation 81 and the tubular formation piece 82 form a unitary structure. The tubular formation 81 and the tubular formation piece 82 can also be provided in one piece with the cleaning piston 80, i.e. all of these parts are to be comprised of a single turned member. Through the cleaning piston 80 and a tubular formation 81 and a tubular formation piece 82 extends a central bore 83.

The cleaning piston 80 and the tubular formation 82 traverse a cylinder cover 120.

Through the central bore 83, filler is fed from the exterior into the reaction mixture flowing out of the discharge tube 70. The meeting of the filler with the reaction mixture can be freely selected in accordance with the length of the tubular formation piece 81 or the axial positioning of the cleaning piston 80 freely. For the invention it is important that via the tubular formation 81, a hose-like flow of the reaction mixture is generated, into which the filler is centrally introduced. The filler is thus ensheathed by the reaction mixture and mixes therewith under conditions in which the filler and the reaction mixture are fed in the same transport direction in an especially undisrupted manner. The process of the invention and the above described apparatus are especially suitable for the combining of long fibers into the reaction mixture, especially of strands of glass fibers or carbon fibers. However, also natural fibers like for example hemp fibers can also be used.

The endless fibers wound on a fiber spool (e.g. glass fiber roving) are engaged by feed rollers 140 and 150 and entrained into the central bore 83 into the hose-like reaction mixture.

The feed rollers 140 and 150 and their drives are journaled on a housing 84 affixed to the tube-like formation piece 82 and moved together with the cleaning piston 80.

One of the feed rollers 140 is provided with cutting devices in the form of blades 160 distributed over the roller periphery, with which the fiber strand can be subdivided into predetermined length segments. The lengths of the segments are optionally variable depending upon the number of blades and the diameter of the roller periphery. The fiber strand, after being fed through the opening 170 is initially engaged by the feed roller 150 and the pressing roller 180, whereupon the fiber strand passes between the two feed rollers 140 and 150 and is shot from the latter centrally into the bore 83.

Basically the feed rollers 140 and 150 or the housing 84 instead of being fastened on the tubular formation piece 82 or on the cleaning piston 80 can also be fastened independently from the cleaning piston 80, for example on the cylinder cover 120, whereby the transfer of the accelerated fiber strand from the feed rollers 140, 150 into the central bore 130 in the tubular formation piece 82 can be effected through the intermediary of a telescoping tube. The fillers are thus not brought directly into contact with the reaction mixture but are first displaced in a transport phase in the same direction as the reaction mixture.

Instead of the mixing head illustrated in FIGS. 1 and 2 in the embodiments (reference characters 1–6) which supply the flowable synthetic resin in the form of a reaction mixture, the discharge tubes 7 or 70 can also be connected to a plastifying unit as can be used with an injection molding machine to produce a thermoplastic synthetic resin from synthetic resin particles. In addition, a connection to an extruder is possible. Both devices supply flowable plastic in the form of a thermoplastic synthetic resin melt.

Figure 3:
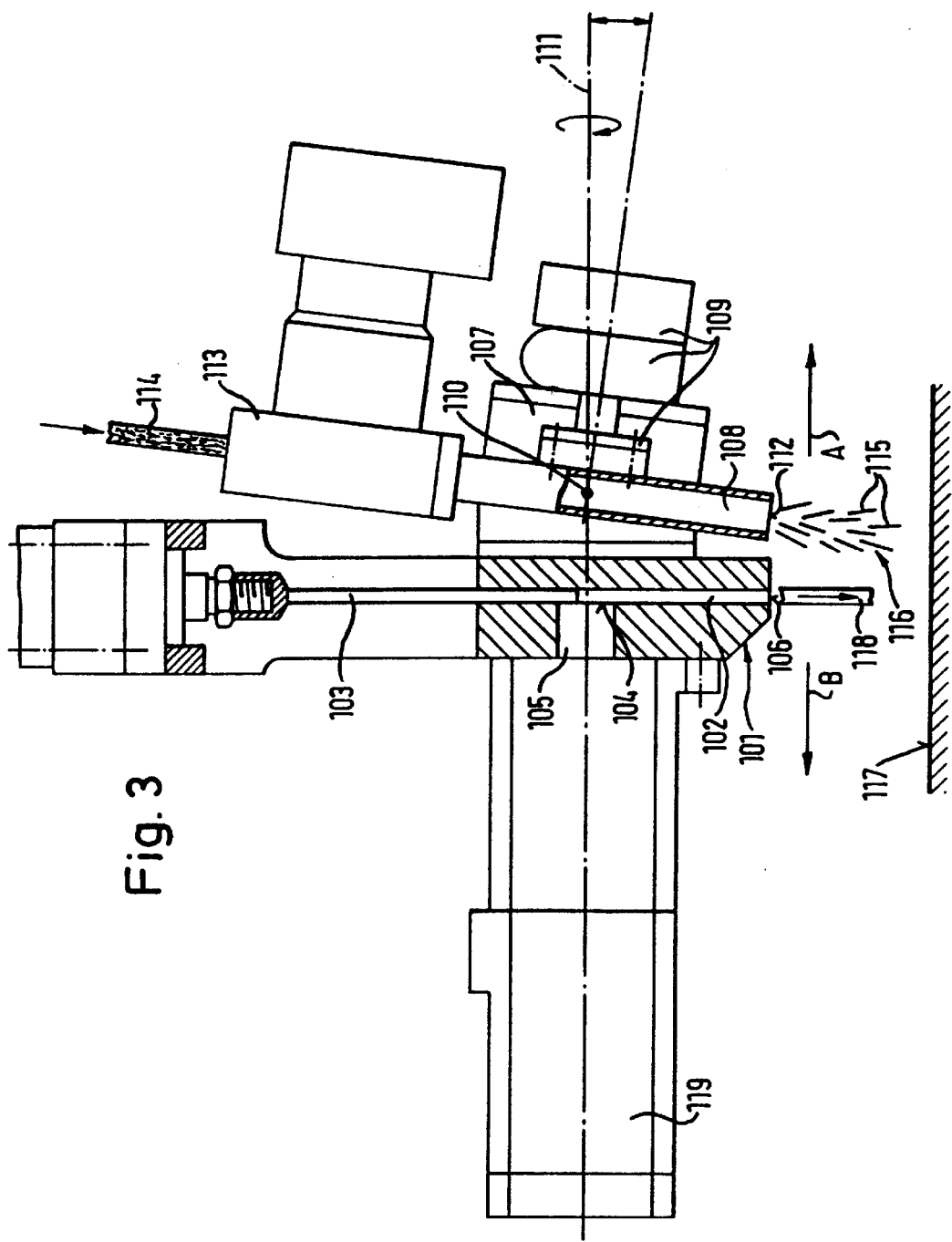
FIG. 3 is a side elevation view, partly broken away, of a mixing head for generating a mixed stream of chemically reactive plastic components with a wide slit nozzle for discharging the mixture and with a fiber feed passage trained upon the mixture outlet zone.

FIG. 3 shows a mixing head 119 corresponding to one of the mixing heads according to FIG. 1 or FIG. 2 in function, in which a flowable plastic in the form of a reaction mixture is generated from chemically reactive synthetic resin components. To the mixing head 100 there is connected a wide slit nozzle 101 shown partially in section and in whose flat passage 102 a flat slider 103 is reversibly arranged. The feed opening 104 opening into the flat passage 102 for the reaction mixture from the mixing head 100 through the feed passage 105 is only partly open by the flat slider 103 which adjusts a throttle effect leading to a further intermixing of the reaction mixture. The flat slider 103 is positionable between a position in which the feed opening 104 is wholly or partly unobstructed to a position in which the flat passage 102 is completely filled. In the latter position the flat slider 103 is shifted toward the outlet opening 106. Upon the shifting of the flat slider, residual reaction mixture is shoved out of the flat passage 102 whereby the walls thereof are simultaneously cleaned from the reaction mixture.

The holder 107 is fixed on the wide slit nozzle 101 and is provided with a fiber feed passage 108 comprised of a tube. By means of a swinging drive 109 the fiber feed passage 108 in the holder 107 is swingable about the axis 110 perpendicular to the drawing plane and about an axis 111. The outlet opening 112 of the fiber feed passage 108 lies approximately in the same plane as the outlet opening 106 of the flat passage 102.

On the opposite end of the fiber feed passage 108 from the outlet opening 112, a feed and cutting arrangement 113 is provided with which an endless fiber feed 114 is coupled. The fiber feed is subdivided into segments 115 of predetermined length and transported through the fiber feed passage 108. The fiber segments 115 arrive at the outlet opening 112 with high velocity in the form of a stream 116 of long reinforcing fibers. This stream is combined with the flow 118 of flowable synthetic resin emerging from the wide slit nozzle 101.

The mixing head 119 can be displaced together with a wide slit nozzle 101 and the fiber feed passage 108 for example with a robot arm (not shown) has a unitarily functioning unit over a surface 117 of an open injection mold not shown in further detail, whereby depending upon the movement direction, first the stream of reinforcing fibers or the stream of flowable synthetic resin can be laid down on the surface 117.

If the functional movement is to the right (direction A), the fiber segments 115 are first deposited upon the surface 117 and then are coated with the band-like flat stream of flowable synthetic resin. After pressing of the deposited of synthetic resin and reinforcing fibers, a synthetic resin part is obtained in which the long reinforcing fibers are embedded in the outer surface regions of the finished plastic part.

If the functional unit is moved to the left (direction B), first the band-like flat stream 118 of flowable synthetic resin is deposited upon the surface 117 and then is covered with the stream of long reinforcing fibers. After the pressing of the deposited materials of synthetic resin and long reinforcing fibers, a plastic part is obtained in which the long reinforcing fibers are predominantly embedded in inner surface regions of the finished plastic part.

Instead of the previously described mixing head 119, a feed passage can be connected to the wide slit nozzle 101 which is supplied with thermoplastic synthetic resin melt via a feed passage, the melt being generated in a plastifier unit or in an extruder (not shown). A band-like flat stream 118 of flowable synthetic resin can, depending upon the unit used, be comprised of a thermoplastic synthetic resin or of a chemical reaction mixture.

FIG. 4 shows the discharge region of the wide slit nozzle 101 with a band-like flat stream 118 of flowable synthetic resin which is deposited on the surface 117 of an open injection mold. The outlet opening 112 of the fiber feed passage 108 is trained thereby upon the left edge region of the band-like flat stream 118 whereby the fiber feed passage includes an acute angle (less than 90°) with the surface of the band-like flat stream 118 so that the long reinforcing fibers initially standing in the edge region come to lie progressively on the surface of the flat stream 188. In this manner it is ensured that the long reinforcing fibers lying at the edge region of the flat stream 118 will not project out beyond the latter. The surface 117 of an injection mold can thus be covered with flowable synthetic resin and with long reinforcing fibers without the fibers projecting beyond the edge of the surface of the mold cavity of the open mold. Thus it can be ensured that no reinforcing fibers will project between the mold separating surfaces of the two mold parts and interfere with closure of the mold.

FIG. 5 shows a functional unit comprised of a wide slit nozzle 101 and two fiber feed passages 108a and 108b and with which by passing over the surface 117 of an open mold. In FIG. 5, the fiber reinforcement is disposed on both sides of the synthetic resin strip 115. FIGS. 6 and 7 show two patterns for depositing the fiber streams on the synthetic resin strip 118.

We claim:

1. An apparatus for producing a fiber-reinforced synthetic resin, comprising:

means for generating a stream of a synthetic resin extending along a first axis and formed with an outlet opening;

means connected with said outlet opening of the means for generating forming a cylindrical outlet chamber for said synthetic resin, said cylindrical outlet chamber extending along a second axis transversal to the first axis and having a mouth at an outlet end thereof;

means forming a fiber feed passage extending along the second axis concentrically in said outlet chamber toward said outlet end and provided opposite said outlet end with means for feeding a stream of reinforcing fibers subdivided into predetermined lengths through said feed passage into said stream of synthetic resin as the synthetic resin emerges from said mouth; and a cleaning piston reversibly displaceable in said outlet chamber, centrally traversed by said fiber feed passage and of an annular shape slidable axially in an annular space between a tubular portion of said feed passage and an inner wall of said chamber in a region of said mouth, said tubular portion being of a diameter smaller than that of said cleaning piston.

2. The apparatus defined in claim 1 wherein said tubular portion forms a hollow tube defining said feed passage traversing said cleaning piston.

3. The apparatus defined in claim 2 wherein said tubular portion forms part of the feed passage traversing said piston, said feed passage being a tube, so that cleaning piston is slidable relative and along said tube.

4. The apparatus defined in claim 2 wherein said hollow tube being fixedly mounted on said cleaning piston to move therewith.

5. The apparatus defined in claim 4 wherein said tube has a variable depth of immersion in said chamber.

6. The apparatus defined in claim 5 wherein said depth of immersion is varied during an injection cycle.

7. The apparatus defined in claim 3 wherein said tube transverses said cleaning piston and a hydraulic piston coupled therewith for actuating same, said hydraulic piston being displaceable in a hydraulic cylinder having a cylinder cover in which said tube is fixed.

8. The apparatus defined in claim 1 wherein said means for feeding said stream of reinforcing fibers includes rollers provided with cutting blades for subdividing an endless filament strand into reinforcing fibers of predetermined lengths.

9. The apparatus defined in claim 8 wherein two pairs of counter rotating rollers are provided with respective cutters for producing reinforcing fibers of different lengths, and means for relatively shifting said pairs of rollers for respectively disposing a selected one of said pairs in juxtaposition with said passage.

10. The apparatus defined in claim 1 further comprising means for feeding a fluidizing gas through said passage to facilitate in treatment of said fibers therethrough.

11. The apparatus defined in claim 1 wherein said means for generating said stream of said synthetic resin includes means for forming a mixture of chemically reactive synthetic resin components flowable toward said outlet opening.

12. The apparatus defined in claim 11 wherein said means for forming said mixture includes a mixing chamber formed with said outlet opening communicating with said outlet chamber and receiving said components, and a control piston displaceable in said mixing chamber for controlling the mixing of said components therein.

13. The apparatus defined in claim 12 wherein said mixing chamber is aligned with said outlet chamber.

14. The apparatus defined in claim 1 wherein said means for generating said stream of said synthetic resin is a plastifier unit producing a melt of a thermoplastic resin.

15. The apparatus defined in claim 1 wherein said means for generating said stream of said synthetic resin forms a unit with said means forming said fiber feed passage and said means forming said outlet chamber.

16. The apparatus defined in claim 15, further comprising a robot arm for displacing said unit relative to an open mold.

17. An apparatus for producing a fiber-reinforced synthetic resin, comprising:

means for generating a stream of a synthetic resin and formed with a outlet opening extending along a first axis;

means connected with said outlet opening of the means for generating forming a cylindrical outlet chamber for said synthetic resin, said cylindrical outlet chamber having a second axis extending transversely to the first axis and a mouth at an outlet end thereof;

means forming a fiber feed passage extending concentrically in said outlet chamber toward said outlet end and provided opposite said outlet end with means for feeding a stream of reinforcing fibers subdivided into predetermined lengths through said feed passage into said stream of synthetic resin as said synthetic resin emerges from said mouth; and a cleaning piston reversibly displaceable in said outlet chamber, centrally traversed by said fiber feed passage and of an annular shape slidable in an annular space between a tubular portion of said feed passage and an inner wall of said chamber between an extending position where said cleaning piston reaches in a region of said mouth thus blocking said outlet opening of the means for generating and a retracted position where said cleaning piston clears said outlet opening, said tubular portion being of a diameter smaller than that of said cleaning piston.

18. An apparatus for producing a fiber-reinforced synthetic resin, comprising:

means for generating a stream of a synthetic resin extending along a first axis and including means for forming a flowable mixture of chemically reactive synthetic resin components;

means connected with said outlet opening of the means for generating forming a cylindrical outlet chamber for said synthetic resin, said cylindrical outlet chamber extending along a second axis transversal to the first axis and having a mouth at an outlet end thereof;

means forming a fiber feed passage extending along the second axis concentrically in said outlet chamber toward said outlet end and provided opposite said outlet end with means for feeding a stream of reinforcing fibers subdivided into predetermined lengths through said feed passage into said stream of synthetic resin as the synthetic resin emerges from said mouth; and a cleaning piston reversibly displaceable in said outlet chamber, centrally traversed by said fiber feed passage and of an annular shape slidable axially in an annular space between a tubular portion of said feed passage and an inner wall of said chamber in a region of said mouth, said tubular portion being of a diameter smaller than that of said cleaning piston.

* * * * *